United States Patent
Tamor et al.

(10) Patent No.: US 7,308,958 B2
(45) Date of Patent: Dec. 18, 2007

(54) METHOD FOR CONTROLLING A SERIES HYBRID ELECTRIC VEHICLE

(75) Inventors: Michael Tamor, Toledo, OH (US);
Anthony Phillips, Northville, MI (US);
Jack Xu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 369 days.

(21) Appl. No.: 10/904,253

(22) Filed: Nov. 1, 2004

(65) Prior Publication Data

US 2006/0090941 A1 May 4, 2006

(51) Int. Cl.
*B60K 1/00* (2006.01)

(52) U.S. Cl. ............ 180/65.1; 180/65.3; 903/941

(58) Field of Classification Search .......... 180/65.1, 180/65.2, 65.3, 65.4; 903/925, 941, 943; 701/22
See application file for complete search history.

(56) References Cited

U.S. PATENT DOCUMENTS

| | | | |
|---|---|---|---|
| 5,318,142 A | 6/1994 | Bates et al. | |
| 5,789,882 A * | 8/1998 | Ibaraki et al. | 318/148 |
| 5,820,172 A | 10/1998 | Brigham et al. | |
| 6,158,537 A | 12/2000 | Nonobe | |
| 6,271,645 B1 | 8/2001 | Schneider et al. | |
| 6,394,209 B1 | 5/2002 | Goehring et al. | |
| 6,449,537 B1 | 9/2002 | Phillips et al. | |
| 6,484,833 B1 | 11/2002 | Chhaya et al. | |
| 6,735,502 B2 * | 5/2004 | Phillips et al. | 701/22 |
| 6,792,341 B2 * | 9/2004 | Hunt et al. | 701/22 |
| 6,991,053 B2 * | 1/2006 | Kuang et al. | 180/65.2 |
| 7,108,088 B2 * | 9/2006 | Muta | 180/65.2 |
| 2002/0095247 A1 | 7/2002 | Ding et al. | |
| 2002/0145404 A1 | 10/2002 | Dasgupta et al. | |
| 2003/0172643 A1 | 9/2003 | Suzuki | |

* cited by examiner

*Primary Examiner*—Christopher P. Ellis
*Assistant Examiner*—Brian Swenson
(74) *Attorney, Agent, or Firm*—David B. Kelley; Brooks Kushman P.C.

(57) ABSTRACT

A method for controlling a series hybrid powertrain for an electric vehicle. The hybrid vehicle includes a primary power source and an electric energy stored system. The method provides total system efficiency with a load-following control strategy.

22 Claims, 2 Drawing Sheets

METHOD FOR CONTROLLING A SERIES HYBRID ELECTRIC VEHICLE

BACKGROUND OF THE INVENTION

1. Field of the Invention

The present invention relates to hybrid electric vehicles having a primary power source and an electric energy storage system.

2. Background Art

There are a number configurations of hybrid electric vehicles (HEVs). Some HEVs include a primary power source (PPS) and an electric energy storage system (ESS). Both power sources can provide electric power for powering a motor.

The motor converts electric power to mechanical power for driving the vehicle. The motor can be the only source of mechanical power for driving the vehicle and/or the motor can operate in conjunction with an engine or other drive means.

The PPS can be a fuel cell, a combined engine-generator, or other electric power producing means. The ESS can be a battery, a capacitor, a combination of the two, or some other device capable of storing and discharging electric energy.

U.S. Pat. No. 5,820,172, which is owned by the assignee of this application, discloses a powertrain for a hybrid electric vehicle wherein the PPS and the ESS are controlled to meet a motive power demand by determining the most fuel efficient combination of PPS and ESS power output.

An imbalance of power generation and power consumption requires frequent charging and discharging of the ESS, thus reducing ESS life and reducing total system efficiency.

A controller disclosed in the '172 patent incurs substantial processing time as it must compute all possible combinations of PPS and ESS power outputs that satisfy the motive power demand. It is desirable, therefore, to provide an improved method with minimal processing time for determining a fuel efficient combination of PPS and ESS power output.

SUMMARY OF THE INVENTION

The present invention relates to an improved method for determining a fuel efficient combination of PPS and ESS power output wherein charging and discharging frequency of the ESS is reduced.

The present invention relates to a number of features and configurations for controlling a vehicle, including a vehicle having a primary power source (PPS) and an electric energy storage system (ESS). The PPS and ESS provide electric power. The electric power is converted to mechanical power by a motor for driving the vehicle.

The present invention will control the vehicle so that the PPS provides power at an fuel efficiency. The method includes calculating motor and ESS power demands. A PPS power demand is calculated to control an amount of power produced by the PPS. The PPS power demand is calculated such that sufficient power is produced by the PPS to meet the motor and ESS power demands.

The present invention develops fuel efficiency without frequent charging and discharging. Power is generated in the ESS at a number of operating points corresponding to different power levels.

The PPS power output is controlled based on predefined PPS operating parameters. The predefined operating parameters are determined from a PPS power schedule. The PPS power schedule includes preselected PPS operating that produce PPS fuel efficiency for the calculated PPS power demand. The predefined parameters limit computation time.

The PPS power schedule can include operating parameters that relate to torque and speed or voltage and current. The torque and speed parameters are used if the PPS is an engine-generator. The voltage and current parameters are used if the PPS is a fuel cell.

Each operating parameter corresponds to a predefined PPS power demand value so that the operating parameters can be automatically determined from the calculated PPS power demand power.

One feature of the present invention includes calculating an auxiliary load power demand. The auxiliary load power demand is included with the ESS and motor power demand so that the PPS can be controlled to provide sufficient power for the auxiliary loads.

Another feature of the present invention includes maintaining the ESS within a predefined state of charge (SOC) range. The method includes a step of calculating the ESS SOC and determining whether the ESS power demand to be positive, negative, or zero. A positive power demand indicates a need to charge the ESS to increase its SOC. A negative power demand indicates a need to discharge the ESS to lower its SOC. A zero power demand indicates the ESS SOC is within range and no charging or discharging is needed. The PPS power demand takes into consideration whether there is a positive, negative, or zero ESS power demand.

DETAILED DESCRIPTION OF THE PREFERRED EMBODIMENT(S)

Figure 1:
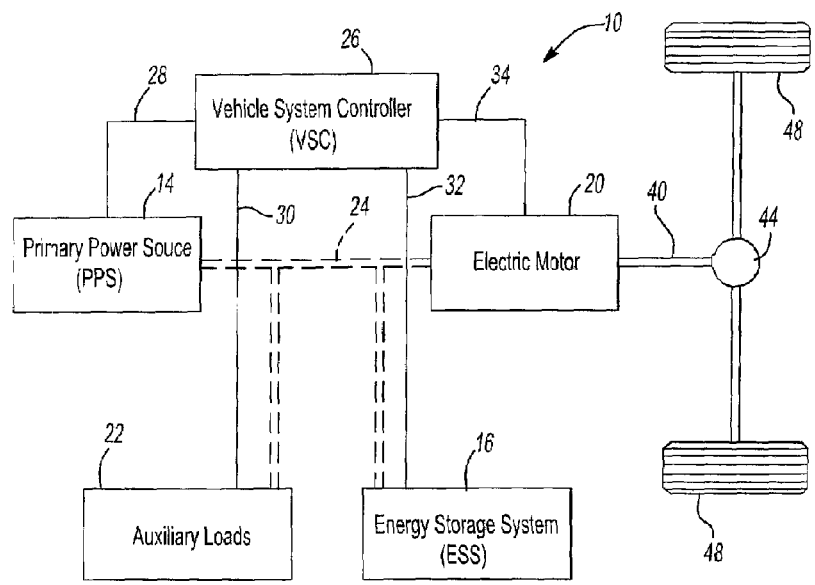
FIG. 1 illustrates a vehicle having a primary power source and an electric energy storage system in accordance with the present invention.

FIG. 1 illustrates a hybrid electric vehicle (HEV) 10 having a primary power source (PPS) 14 and energy storage system (ESS) 16. PPS 14 and ESS 16 provide electric power to electric motor 20. Motor 20 converts the electric power to mechanical power for driving axle 40, and thereby differential 44 and wheels 48.

The illustrated configuration of HEV 10 illustrates only a functional relationship within the vehicle. The illustrated configuration is not intended to limit the scope of the present invention.

PPS 14 can be any power source capable of generating electric energy. PPS 14 can be a fuel cell or an internal combustion engine combined with a generator, or another other configuration capable or producing electric power.

ESS 16 can be any system capable of storing and releasing electric energy through charging and discharging. ESS 16 can be a battery, a capacitor, or a combination of the two.

Auxiliary loads 22 include one or more devices that consume power from PPS 14 or ESS 16. Auxiliary loads 22 can include an air conditioning unit, a heating unit, a power steering unit, or a DC/DC charger unit for charging an auxiliary battery.

Power bus 24 electrically connects PPS 14, ESS 16, electric motor 20, and auxiliary loads 22. Bus 24 is preferably a high voltage power bus with an ability to transfer electric power therebetween.

Vehicle system controller (VSC) 26 controls operation of PPS 14, ESS 16, electric motor 20, and auxiliary loads 22. Communication lines 28, 30, 32, and 34 are provided to facilitate this control by allowing VSC 24 to communicate signals for both controlling and monitoring PPS 14, ESS 16, electric motor 20, and auxiliary loads 22.

VSC 26 controls transfer of electric power throughout HEV 10. VSC 26 executes all control functions, but it could also be configured to communicate with and control separate controllers that may be provided for PPS 14, ESS 16, electric motor 20, and auxiliary loads 22.

Motor 20 receives power through power bus 24 from one or both of PPS 14 and ESS 16 to drive HEV 10. Motor 20 converts the received electric power to mechanical power for driving axle 40 and differential 44 and thereby driving wheels 48.

While not shown, other components can be disposed between wheels 48 and motor 20 for controlling transfer of mechanical power. Once such component is a transmission, which has gearing to transfer energy to wheels 48.

In operation, VSC 26 receives a turn-on demand from a driver. Typically, an ignition (not shown) is provided for this purpose. Once the vehicle is turned on, VSC 26 determines a control strategy for controlling PPS 14, ESS 16, electric motor 20, and auxiliary loads 22.

On vehicle start-up VSC 26 controls ESS 16 to provide power to PPS 14 and auxiliary loads 22. This can be done for any number of reasons. Generally, however, it is desirable to use ESS power for cranking an engine or starting a fuel cell, depending on the type of power source of PPS 14. Also, it may be desirable to drive auxiliary loads 22.

After initial start-up, HEV 10 can accept torque demands from the driver. Typically, an accelerator pedal (not shown) is provided for this purpose. Other commands can also be received by HEV 10 for other driver demands, such as driver demands for operating auxiliary loads 22.

In response to these demands, VSC 26 controls power usage for PPS 14, ESS 16, electric motor 20, and auxiliary loads 22. Preferably, VSC 26 controls these items by generating a number of power demand signals and communicating these signals to each of PPS 14, ESS 16, electric motor 20, and auxiliary loads 22.

Figure 2:
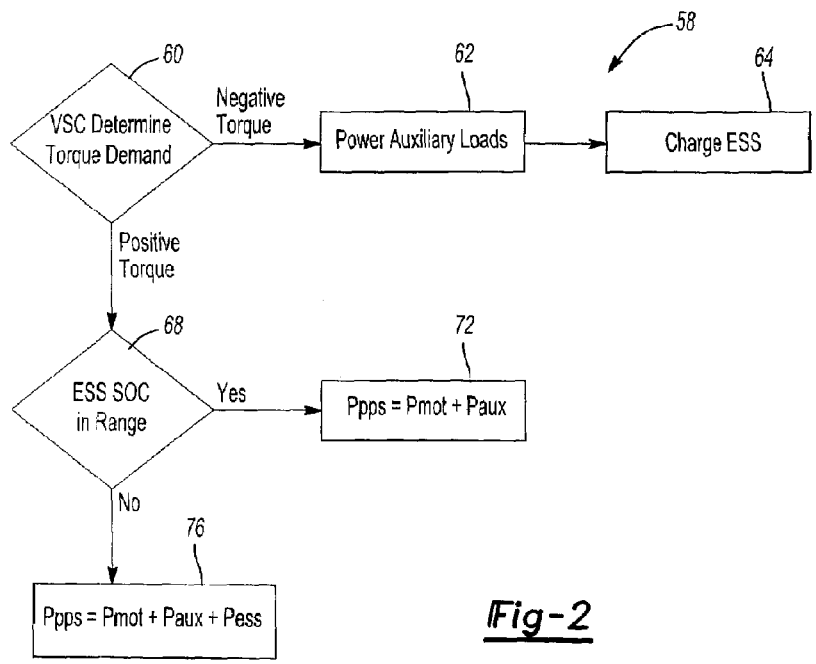
FIG. 2 illustrates a flowchart for a method of controlling the series hybrid electric vehicle in accordance with the present invention.

FIG. 2 illustrates a flowchart 58 which depicts a method for controlling operation of HEV 10 in accordance of the present invention. The method may be referred to as a load-following control.

At decision block 60 it is determined VSC 26 whether a positive or negative torque demand is required. A positive torque determination indicates to a need to provide positive torque to wheels 48, and a negative torque command indicates a need to brake wheels 48, such as through regenerative braking of motor 20. VSC makes this determination based on the demands received from the driver and other HEV 10 operating conditions.

Action block 62 relates to powering auxiliary loads 22 from the regenerative braking of motor 20. In this case, VSC 26 issues motor 20 a negative power demand (Pmot) to prompt motor 20 to generate electric power from the mechanical energy of wheels 48. At the same time, VSC 26 issues auxiliary loads 22 a positive power demand (Paux) to prompt loads 22 to consume energy generated by the regenerative braking of motor 20.

Block 64 relates to charging ESS with a portion of the energy generated during regenerative braking. Block 64 can be executed instead of block 62, or in combination therewith.

The charging of ESS is performed if a state of charge (SOC) of ESS is less than a predefined charge threshold. This is typically done to ensure ESS 16 will be properly charged for later discharge. The charge threshold is a selectable threshold, which can be based on the particular ESS configuration.

VSC 24 monitors the state of charge (SOC) of ESS 16 to control the charging and to determine whether charging is needed. For example, ESS 16 is charged if the charge threshold is set at 60% and ESS 16 is less than 60% charged.

VSC 26 provides a negative power demand (Pmot) to motor 20 to request energy generation through regenerative braking and a positive power demand (Pess) to ESS 14 to accept power if ESS charging is needed. VSC 26 may coordinate the control from blocks 64 and 62 so that both auxiliary loads 22 and ESS 16 receive power from the same regenerative braking event.

Block 68 relates to a positive torque demand. The positive torque demand corresponds with a need to provide electric energy to motor 20. This includes determining whether the power provided to motor 20 comes from PPS 14 or from ESS 14, or from both. Preferably, the determination is made based on the SOC of ESS 14. The target ESS SOC range can vary depending on ESS 16, and it can be controlled by VSC 26. For example, if ESS 16 is a battery, ESS 16 is wihtin range if the battery SOC is within a range of 40-60%. In this example, ESS 16 is over range if its SOC is greater than 60% and it is below range if its SOC is less than 40%.

At action block 72, if ESS SOC is in range, it is determined whether VSC 26 generating power demands such that power output of PPS 14 (Ppps) is a function of or equals power demand of motor (Pmot) and power demand of auxiliary loads 22 (Paux).

Pmot is a positive demand for power as motor 20 must receive power to provide positive torque. Paux is a positive demand for powering auxiliary loads 22. In some cases, it may be desirable to prevent powering of auxiliary loads 22, in which case VSC 26 would set Paux to zero.

Thus, Ppps corresponds to all electric energy load demand for high voltage energy in HEV 10. Based on this demand, VSC 26 issues the appropriate power demands to PPS 14, ESS 16, motor 20, and loads 22 to accept, provide, or reject power as needed.

Preferably, VSC 26 sets an operating parameter for PPS 14 to control PPS 14 at is efficiency. This efficiency is based on the entire system. For example, if PPS 14 is an engine-generator (i.e., includes an engine and a generator), VSC 26 controls the engine-generator operating parameters of torque and speed. If PPS 14 is a fuel cell, VSC 26 controls the fuel cell operating parameters of voltage and current.

The efficiency can be determined by creating an power efficiency schedule. The power schedule predefines the operating parameters according to PPS power demand. The defining of the PPS power demand schedule can take a number of forms.

Figure 3:
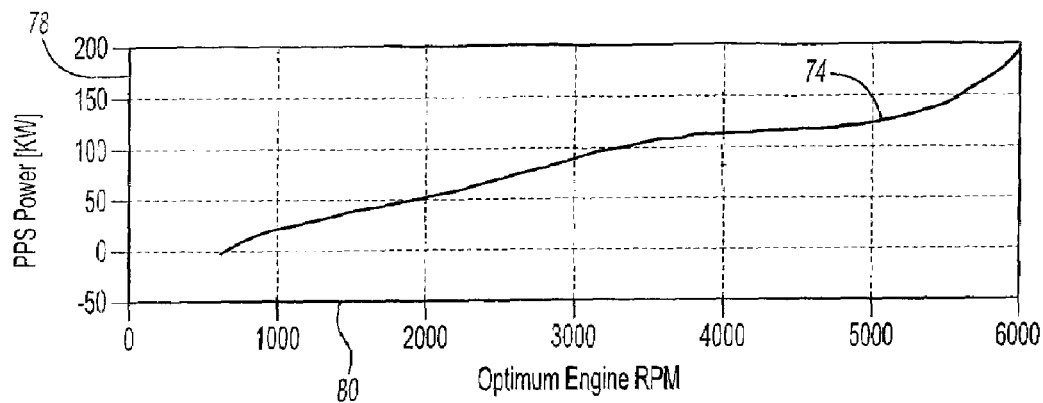
FIG. 3 illustrates a graph of optimum engine speed verse PPS power demand in accordance with the present invention.
Figure 4:
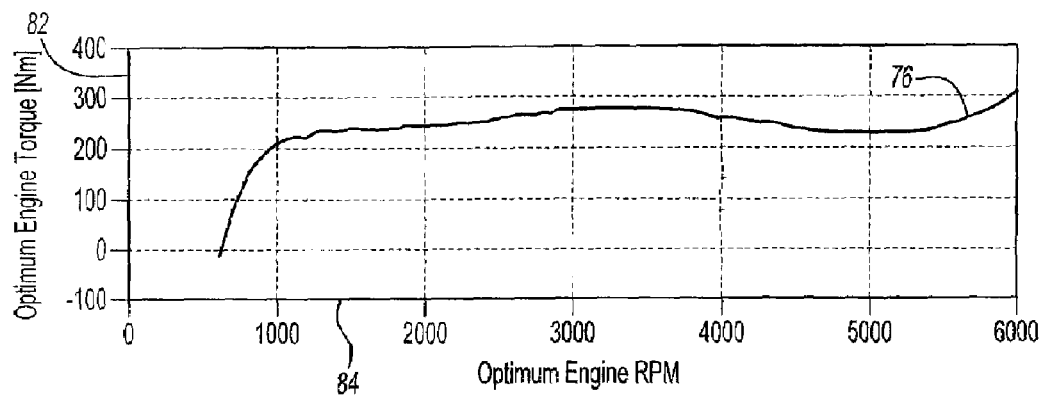
FIG. 4 illustrates a graph of optimum engine torque verse optimum engine speed in accordance with the present invention.

FIGS. 3-4 illustrates a power schedule for engine speed graph 74 and torque graph 76 for defining the operating parameters for a PPS, including an engine-generator. Graph 74 of FIG. 3 determines an optimum engine speed value based on the PPS power demand. Vertical axis 78 corresponds with the PPS power demand and horizontal axis 80 corresponds with the engine speed (RPM). Torque graph of FIG. 4 determines optimum engine torque from the optimum engine speed determined in FIG. 3. Vertical axis 82 corresponds with the engine torque and horizontal axis 84 corresponds with the engine speed (RPM).

The power scheduling is a predefined logic programmed into the VSC 26 so that VSC 26 performs limited computations. VSC 26 calculates the PPS power demand value and then looks up the optimum engine speed from graph 74. It then looks up the optimum engine torque from graph 76. Preferably, the graphs 74 and 76 are stored as look-up tables or other fixed medium in a memory of VSC 26.

The power schedule preferably corresponds with the total system efficiency of PPS 14. This requires an understanding of the efficiency for the engine at a given speed and load, and the efficiency for the generator at a given speed and load. The total engine-generator efficiency is then determined by multiplying the individual efficiencies of the engine and generator at different torques and speeds.

VSC 26 stores the optimum engine speed and torque graphs so that it can select the optimum torque and speed for the given power demand. The present invention is advantageous from a fuel consumption point of view because it provides the best overall system efficiency and thus maximizes fuel usage. System which are based only on engine efficiency or generator efficiency fail to consider the derogatory effects of controlling the engine at efficiency at the expense of the efficiency of the generator, or controlling the generator at the expense of the engine. The power schedules can be updated by VSC 26 to reflect vehicle operating changes.

Figure 5:
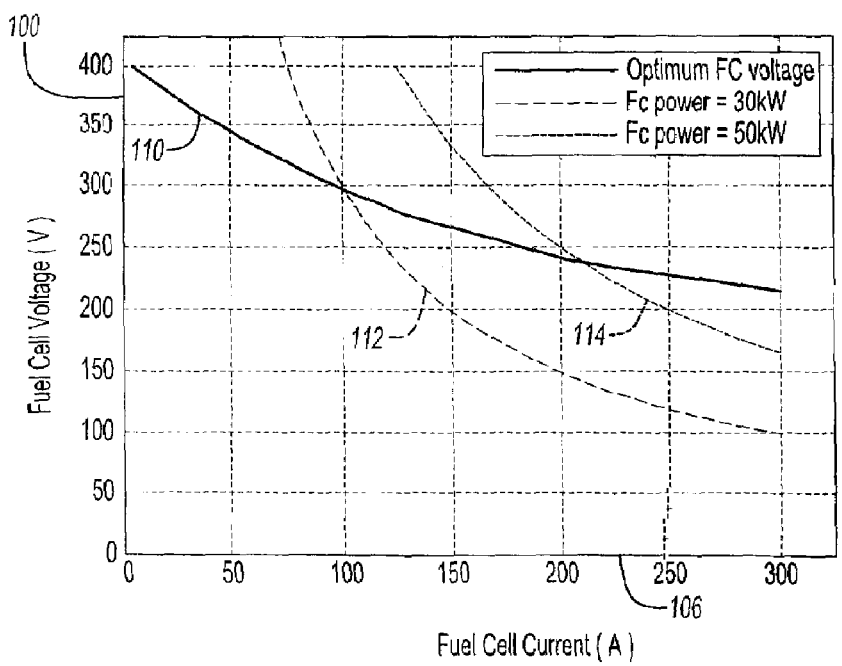
FIG. 5 illustrates a graph of optimum voltage and current for a given PPS (fuel cell) power demand in accordance with the present invention.

FIG. 5 illustrates a graph of a power schedule for voltage and current for defining the operating parameters for a PPS that is fuel cell. A vertical axis 100 corresponds with the fuel cell voltage and a horizontal axis 106 corresponds with the fuel cell current. The coordinate of every point on a curve "Optimum FC voltage" 110 represents an optimum power schedule. For every PPS power demand there is a hyperbola in the fuel cell voltage-current plane. The intersection of this hyperbola with the curve "Optimum FC voltage" 110 represents the optimum power schedule for this given PPS demand. For illustration, two hyperbolas 112 and 114, i.e., 30 kw and 50 kw, are given in this figure.

As seen in FIG. 2, it is determined at action block 76 whether ESS SOC is out of range at block 68, and whether VSC 26 generating power demands are such that Ppps equals Pmot, Paux, plus a power demand for ESS (Pess). This provides further load-following control, which allows VSC 26 to charge and discharge SOC to its desired charge.

Pess is positive if the state of charge of ESS is below its lower charge limit. This is done so that PPS 14 is forced to generate excess power, which can be used to charge ESS 14 in addition to any powering of motor 20 and/or auxiliary loads 22. Pess is negative if the state of charge of ESS is greater than its upper charge limit. This is done so that ESS 14 can be discharged to its desired charge range for future collection of motor regenerative energy.

The present invention provides load-following control, which matches PPS 14 output to HEV 10 power needs because VSC 26 provides for variable power output control of PPS 14.

While the best mode for carrying out the invention has been described in detail, those familiar with the art to which this invention relates will recognize various alternative designs and embodiments for practicing the invention as defined by the following claims. In particular, those familiar in the art will recognize the present invention can be used with any series HEV configuration, including parallel and parallel-series hybrid electric vehicles.

What is claimed is:

1. A method for controlling operation of a vehicle having a primary power source (PPS) and an energy storage system (ESS), the PPS and ESS providing electric power to a motor for driving the vehicle, the method comprising:
   calculating a motor power demand;
   calculating an ESS power demand;
   calculating a PPS power demand to meet the motor and ESS power demands; and
   controlling PPS power output to meet the PPS power demand, the PPS power output controlled being based on a PPS power schedule that includes predefined PPS operating parameters to produce PPS fuel efficiency for the PPS power demand.

2. The method of claim 1, wherein the PPS operating parameters include torque and speed values, and wherein defining the PPS power schedule includes defining a PPS power schedule according to PPS optimum torque and speed graphs.

3. The method of claim 2, further comprising the step of defining the PPS power schedule based on whether the PPS includes an engine-generator.

4. The method of claim 3, further comprising the step of defining the PPS power schedule based on efficiency of the engine multiplied by efficiency of the generator.

5. The method of claim 2, further comprising defining the PPS power schedule based on whether the PPS includes a fuel cell.

6. The method of claim 5, further comprising defining the PPS power schedule based on PPS optimum voltage and current graphs.

7. The method of claim 1, further comprising determining an auxiliary load power demand, and wherein the PPS power demand is calculated to meet the ESS, motor, and auxiliary load power demands.

8. The method of claim 1, wherein calculating the ESS power demand include determining a state of charge (SOC) for the ESS.

9. The method of claim 8, wherein the ESS power demand is determined to be positive if the ESS SOC is less than a predefined SOC value so that the ESS can be charged by the PPS so as to maintain the ESS within a predefined SOC range.

10. The method of claim 8, wherein the ESS power demand is determined to be negative if the ESS SOC is greater than a predefined SOC value so that the ESS is discharged to supplement PPS power to maintain the ESS within a predefined SOC range.

11. A method for controlling operation of a vehicle having a primary power source (PPS) and an energy storage system (ESS), the PPS and ESS providing electric power to a motor for driving a vehicle, the method comprising
   calculating a motor power demand;
   calculating an ESS power demand;
   calculating a PPS power demand to meet the motor and ESS power demands; and
   controlling PPS power output to meet PPS power demand, the PPS power output being controlled based on a PPS look-up table that includes predefined PPS operating parameters that produce PPS fuel efficiency for the PPS power demand.

12. The method of claim 11, wherein the operating parameters are torque and speed, and wherein the method further comprises the step of defining the PPS look-up table according to PPS optimum torque and speed graphs.

13. The method of claim 12, further comprising defining the PPS look-up table based on whether the PPS includes an engine-generator.

14. The method of claim 13, further comprising defining the PPS look-up table based on efficiency of the engine multiplied by efficiency of the generator.

15. The method of claim 11, wherein the operating parameters are voltage and current, and wherein the method further comprises defining the PPS look-up table based on PPS optimum voltage and current graphs.

16. The method of claim 15, further comprising defining the PPS look-up table based on whether the PPS including a fuel cell.

17. The method of claim 11, further comprising determining an auxiliary load power demand, and wherein the PPS power demand is calculated to meet the ESS, motor, and auxiliary load power demands.

18. The method of claim 11, wherein the step of calculating the ESS power demand include determining a state of charge (SOC) for the ESS.

19. The method of claim 18, wherein the ESS power demand is determined to be positive if the ESS SOC is less than a predefined SOC value so that the ESS can be charged by the PPS so as to maintain the ESS within a predefined SOC range.

20. The method of claim 18, wherein the ESS power demand is determined to be negative if the ESS SOC is greater than a predefined SOC value so that the ESS is discharged to supplement PPS power to maintain the ESS within a predefined SOC range.

21. A method for controlling operation of a vehicle having a primary power source (PPS) being an engine-generator and an energy storage system (ESS), the PPS and ESS providing electric power to a motor for driving the vehicle, the method comprising:

calculating a motor power demand;
    calculating an ESS power demand;
    calculating a PPS power demand to meet the motor and ESS power demands; and
    determining PPS operating conditions to efficiently produce power sufficient to meet the PPS power demand, the PPS operating conditions being based on a PPS power schedule having a speed graph for looking-up an optimum speed for the engine-generator as a function of the PPS power demand and a torque graph for looking-up an optimum torque for the engine-generator as a function of the optimum speed determined from the speed graph; and
    efficiently producing the PPS power demand by controlling the engine-generator according to the optimum speed and torque.

22. A method for controlling operation of a vehicle having a primary power source (PPS) being a fuel cell and an energy storage system (ESS), the PPS and ESS providing electric power to a motor for driving a vehicle, the method comprising:

calculating a motor power demand;
    calculating an ESS power demand;
    calculating a PPS power demand to meet the motor and ESS power demands; and
    controlling determining PPS operating conditions to efficiently produce power sufficient to meet the PPS power demand, the PPS operating conditions being controlled based on a PPS look-up table having an optimum voltage curve for specifying optimum voltage and current operating conditions for the fuel cell, wherein the optimum PPS voltage and current operating conditions are determined to correspond with intersection of the PPS power demand with the optimum voltage curve; and
    efficiently producing the PPS power demand by controlling the fuel cell according to the optimum voltage and current.
    that includes predefined PPS operating parameters that produce PPS fuel efficiency for the PPS power demand.

* * * * *